United States Patent
Nutaro et al.

(10) Patent No.: US 9,268,478 B2
(45) Date of Patent: Feb. 23, 2016

(54) TOUCH SCREEN SYSTEM FOR USE WITH A COMMANDED SYSTEM REQUIRING HIGH INTEGRITY

(75) Inventors: Joseph J. Nutaro, Phoenix, AZ (US); James Tyrrell, Peoria, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 1502 days.

(21) Appl. No.: 12/751,601

(22) Filed: Mar. 31, 2010

(65) Prior Publication Data

US 2011/0242040 A1  Oct. 6, 2011

(51) Int. Cl.
G06F 3/041 (2006.01)
G06F 3/048 (2013.01)
G06F 3/0488 (2013.01)

(52) U.S. Cl.
CPC ............ *G06F 3/0488* (2013.01); *G06F 3/0418* (2013.01)

(58) Field of Classification Search
USPC .................................................. 345/173–175
See application file for complete search history.

(56) References Cited

U.S. PATENT DOCUMENTS

| | | | |
|---|---|---|---|
| 5,416,705 A | 5/1995 | Barnett | |
| 6,492,979 B1 | 12/2002 | Kent et al. | |
| 6,573,914 B1 | 6/2003 | Pauly et al. | |
| 7,324,095 B2 | 1/2008 | Sharma | |
| 7,629,969 B2 | 12/2009 | Kent | |
| 8,264,376 B1 * | 9/2012 | McLoughlin et al. | 340/945 |
| 2004/0113895 A1 * | 6/2004 | Lubarsky et al. | 345/174 |
| 2006/0195234 A1 | 8/2006 | Chen et al. | |
| 2007/0052688 A1 | 3/2007 | Muranaka et al. | |
| 2007/0063986 A1 * | 3/2007 | Hoga et al. | 345/173 |
| 2007/0150842 A1 * | 6/2007 | Chaudhri et al. | 715/863 |
| 2007/0236468 A1 * | 10/2007 | Tuli | 345/173 |
| 2008/0122803 A1 * | 5/2008 | Izadi et al. | 345/175 |
| 2009/0051660 A1 | 2/2009 | Feland, III et al. | |
| 2009/0296131 A1 * | 12/2009 | Yoshida et al. | 358/1.15 |
| 2010/0099462 A1 * | 4/2010 | Baek et al. | 455/566 |
| 2010/0156809 A1 * | 6/2010 | Nutaro et al. | 345/173 |
| 2010/0245289 A1 * | 9/2010 | Svajda | 345/175 |
| 2010/0306702 A1 * | 12/2010 | Warner | G06F 3/0482 715/811 |

* cited by examiner

*Primary Examiner* — Ilana Spar
*Assistant Examiner* — Nguyen H Truong
(74) *Attorney, Agent, or Firm* — Ingrassia Fisher & Lorenz, P.C.

(57) ABSTRACT

A touch screen system is provided herein for use with a commanded system requiring high integrity. The touch screen system includes, but is not limited to, a display screen configured to present information to an operator. A sensor array is arranged proximate the display screen to detect a touch on the display screen and to generate a set of touch position coordinates corresponding to a location of the touch. A processor is operatively coupled to the display screen and is configured to command the display screen to arrange a plurality of touch target images such one of the touch target images is a high integrity touch target image. The high integrity touch target image has a unique X-coordinate that is not shared by any other touch target image and a unique Y-coordinate that is not shared by any other touch target image.

18 Claims, 6 Drawing Sheets

TOUCH SCREEN SYSTEM FOR USE WITH A COMMANDED SYSTEM REQUIRING HIGH INTEGRITY

TECHNICAL FIELD

The present invention generally relates to touch screen systems, and more particularly relates to touch screen systems for use with a commanded system requiring high integrity.

BACKGROUND

Touch screen systems are control systems that are commonly used to control electrical, mechanical and computer systems (hereinafter, "commanded systems"). Touch screen systems present information to an operator with a display screen that is adapted to detect a touch (e.g., physical contact or near physical contact made using a body part, a stylus, a light projector or by some other means of contact). The operator provides an input into a touch screen system by touching the touch sensitive screen. For example, the operator may be presented with images on the display screen that include both text and collocated or associated graphics (e.g., a textual question and closely located "yes" and "no" boxes) and the operator may input a selection into the touch screen system by touching the graphics that corresponds with the operator's choice.

Multiple technologies are available to detect the occurrence and location of the operator's touch on the display screen. Some of the more common technologies include resistive, surface capacitive, projected capacitive, infrared, surface acoustic wave, acoustic pulse recognition, and camera based technologies. Each technology, while generally reliable, experiences occasional errors. It is postulated that each touch screen system employing any one of these technologies may occasionally incorrectly determine the location of the operator's touch or may detect a touch at a time when the operator did not touch the touch sensitive screen.

For some uses, such as selecting a radio station on a stereo, an occasional error may be inconsequential, especially as the operator soon recognizes the error, and thus the use of a touch screen system to control a commanded system in such instances may be acceptable. For other applications, however, an error, especially one undetected by the operator, could potentially have very serious consequences. This may be for safety reasons (as in avionics or industrial control), customer satisfaction reasons (e.g., in an automobile selecting high and low beams), or even financial reasons (in an automatic teller machine transferring money). For example, the avionics system of an aircraft in flight would require a control system that has an exceedingly low error rate, especially if undetectable by the operator, because the commanded system on the aircraft may directly control the aircraft's flight performance and could therefore have a direct impact on passengers and flight crew.

The Federal Aviation Administration (hereinafter, "FAA") has ranked various aircraft functions for safety needs on a sliding scale that ranges from minor to catastrophic events. If an aircraft function failure creates a failure condition whose severity is deemed to be "minor", then that function may be controlled by a control system having a postulated failure probability that exceeds 1/100,000 per flight hour. If an aircraft function failure creates a failure condition whose severity is deemed to be "major", then that function must be controlled by a control system having a postulated failure probability that is less than 1/100,000 per flight hour. If the function failure creates a failure condition whose severity is deemed to be "hazardous", then that function must be controlled by a control system having a postulated failure probability that is less than 1/10,000,000 per flight hour. And if the function creates a failure condition whose severity deemed to be "catastrophic", then that function must be controlled by a control system having a postulated failure probability that is less than 1/1,000,000,000 per flight hour. A minor failure condition has a slight reduction in aircraft safety margins; a major failure condition has a significant reduction in safety margins and may result in some occupant discomfort; a hazardous failure condition has a large reduction in safety margins and may have adverse effects upon occupants; a catastrophic failure condition can result in conditions which prevent safe landing and loss of aircraft. Similar definitions and categories are used in other industries such as industrial control, and by other safety authorities.

The concept of "failure" has several aspects which include detection and permanence. "Failure" denotes the inability to operate in situations where the pilot either knows that the equipment is nonoperational and takes appropriate action, or the system is designed such that a failure of one element results in another part of the system compensating with or without the pilot's knowledge thus averting a failure condition. An example of this is an automatic cabin temperature controller. If this equipment fails, the pilot may feel uncomfortable and can switch to manual control or activate a secondary temperature controller. Alternatively, several controllers can operate in parallel and one may be designed to automatically takes over when another fails without pilot interference and possibly without the pilot knowledge.

In another aspect, "failure" means an uncorrected equipment failure that the pilot is not aware of. This undetected failure can result in a condition typically called an "undetected hazard" or "undetected misleading data". This has the possibility of providing misleading data or control information to the pilot. An example of this is an altimeter malfunction. If the altimeter is showing the wrong altitude and if there is no indication to the pilot that the altimeter is operating improperly and if there are no other means to detect the malfunctioning altimeter, the consequences could be quite serious. For this reason, there are typically several independent sources of altitude and altimeters in the flight deck which the pilot can scan to verify that all are registering the same altitudes, within appropriate limits.

As used herein, the term "failure" refers to failures which are both permanent and transitory in nature. For example, a permanent failure can be the breaking of a wire or the cracking of a resistor. A transitory failure may include radiation or radio interference changing a bit in a register, components drifting in and out of specification due to environmental conditions, or other similar short term variations.

The term "integrity" is an attribute of an item indicating that it can be relied upon to work correctly on demand. Therefore an item having "high integrity" can be relied upon to perform the most critical functions such as an autopilot and items having "low integrity" can be relegated to non-critical functions such as lighting control. In the avionics industry, "integrity" has several aspects. One aspect is the probability at which undetected failures occur. Another aspect is the probability at which undetected failures caused by errors (as opposed to equipment failures) occur.

In the current state of the art, the use of touch screens in avionics is predominately for actions where failures of integrity will result only in minor failure conditions or, at most, in a limited number of major failure conditions. In the current state of the art, if a failure condition supported by a touch screen requires a higher level of integrity, then one mitigating technique is for the pilot to observe that the command from the touch screen has reached the commanded system, and to allow the control action to take place only after the pilot confirms that the system being commanded has received the proper request from the touch screen. For example, to lower the aircraft's landing gear, the pilot selects a gear down graphic on the touch screen. The touch screen then displays a query initiated by the landing gear system asking the pilot to confirm the "gear down" command is the intended command. If the pilot agrees that a "gear down" request was made via the touch screen system, then the pilot selects a confirming graphic (i.e., a "yes" button) to actuate the mechanism for lowering the landing gear. Once the confirming graphic has been selected, the landing gear will be lowered. In this manner, a higher integrity is provided by the touch screen because the touch screen's buttons and sensors, the touch screen's display, and the landing gear system must all fail in order to have the incorrect data transferred. The landing gear is only taken as an example and the description is not intended to imply the actual failure condition severity.

While this approach is adequate, it requires multiple pilot actions to execute a single command and this may be awkward or time consuming in certain flight situations such as in an emergency condition or upon takeoff or landing. At these times, the pilot will want to take a single rapid action, not multiple actions.

BRIEF SUMMARY

Touch screen systems for use with a commanded system requiring high integrity are disclosed herein.

In an embodiment, the touch screen system includes, but is not limited to, a display screen that is configured to present information to an operator. A sensor array is arranged proximate the display screen. The sensor array is configured to detect a touch by the operator on the display screen and to generate a set of touch position coordinates corresponding to a location of the touch on the display screen. A processor is operatively coupled to the display screen and is configured to provide commands to the display screen to display a plurality of touch target images. The processor is further configured to command the display screen to arrange the plurality of touch target images such that one of the touch target images is a high integrity touch target image having a unique X-coordinate that is not shared by any other touch target image and a unique Y-coordinate that is not shared by any other touch target image.

In another embodiment, the touch screen system includes, but is not limited to, a display screen that is configured to present information to an operator. A sensor array is arranged proximate the display screen. The sensor array is configured to detect a touch by the operator on the display screen and to generate a set of touch position coordinates corresponding to a location of the touch on the display screen. The touch screen system also includes a data storage unit. A processor is operatively coupled to the display screen and to the data storage unit and is communicatively connected to the sensor array. The processor is configured to provide commands to the display screen to display a plurality of touch target images. The processor is further configured to command the display screen to arrange the plurality of touch target images such that at least two of the touch target images are high integrity touch target images that each have a unique X-coordinate that is not shared by any other touch target image and a unique Y-coordinate that is not shared by any other touch target image. The data storage unit is configured to store a list of the unique X-coordinate and a corresponding unique Y-coordinate for each of the high integrity touch target images. The processor is further configured to receive the set of touch position coordinates from the sensor array and to obtain the list from the data storage unit. The processor is further configured to invalidate the touch when the set of touch position coordinates includes the unique X-coordinate of any of the high integrity touch target images but lacks the unique Y-coordinate corresponding to the unique X-coordinate, and vice versa. The processor is further configured to invalidate the touch when less than a predetermined number of high integrity touch target images are touched.

In yet another embodiment, the touch screen system includes, but is not limited to, a display screen that is configured to present information to an operator. A processor is operatively coupled to the display screen and is configured to provide commands to the display screen to display a plurality of touch target images and to arrange the touch target images such that one of the touch target images is a high integrity touch target image having a unique X-coordinate that is not shared by any other touch target image and a unique Y-coordinate that is not shared by any other touch target image. A first sensor array is arranged proximate the display screen. The first sensor array is configured to detect exclusively an X-coordinate of a touch by the operator on the display screen. A first electronics array is associated with the first sensor array. The first electronics array is configured to receive the X-coordinate from the first sensor array and is further configured to store a list of the unique X-coordinate and the corresponding unique Y-coordinate for the high integrity touch target image. A second sensor array is arranged proximate the display screen. The second sensor array is configured to detect exclusively a Y-coordinate of the touch by the operator on the display screen. A second electronics array is associated with the second sensor array. The second electronics array is configured to receive the Y-coordinate from the second sensor array. The first electronics array and the second electronics array are communicatively connected. The second electronics array is configured to provide the Y-coordinate of the touch to the first electronics array. The first electronics array is configured to utilize the list of the unique X-coordinate and the corresponding unique Y-coordinate to determine whether the Y-coordinate of the touch corresponds to the X-coordinate of the touch when the X-coordinate of the touch is the unique X-coordinate and to invalidate the touch when the Y-coordinate is not the unique Y-coordinate.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Various embodiments of a touch screen system for use with a commanded system requiring high integrity are disclosed herein. The touch screen system is configured to present graphical images, referred to herein as "touch target images", to an operator on a display screen. The touch screen system is further configured to detect a touch by the operator on the display screen, to determine the location of the touch (e.g., X and Y coordinates) on the display screen, and to determine whether the touch correlates with any of the touch target images (e.g., by comparing the X and Y coordinates of the detected touch with the X and Y coordinates of the touch target images). The touch target images are associated with commands that will be forwarded to the commanded system for action in accordance with the command when the corresponding touch target image is selected (i.e., touched).

Some of the touch target images are associated with commands requiring high integrity. These images are referred to herein as "high integrity touch target images". The touch screen system is configured to present each high integrity touch target image in a manner such that each high integrity touch target image has a unique X coordinate and also a unique Y coordinate. Accordingly, none of the other touch target images (including other high integrity touch target images) will share either an X coordinate or a Y coordinate with any of the high integrity touch target images on a display screen. Arranging each high integrity touch target image on the display screen in this manner significantly reduces the likelihood that it will be selected by mistake.

Additionally, the touch screen system may be further configured to invalidate any touch detected having an X coordinate of any of the high integrity touch target images unless a corresponding Y coordinate for the same high integrity touch target image is also detected. Similarly, the touch screen system may also be configured to invalidate any touch having a Y coordinate of any of the high integrity touch target images unless a corresponding X coordinate for the same high integrity touch target image is also detected.

In some embodiments, the touch screen system may employ two different sensor arrays, one configured to detect only the X coordinate location of a touch and the other configured to detect only the Y coordinate location of a touch. These two sensor arrays, and their associated electronics arrays, may store a list of unique X and Y coordinates for the displayed high integrity touch target images, may share their detected touch coordinates with one another, and may utilize the stored list of unique X and Y coordinates to validate or invalidate a detected touch.

A greater understanding of the embodiments of the system disclosed herein may be obtained through a review of the illustrations accompanying this application together with a review of the detailed description that follows.

Figure 1:
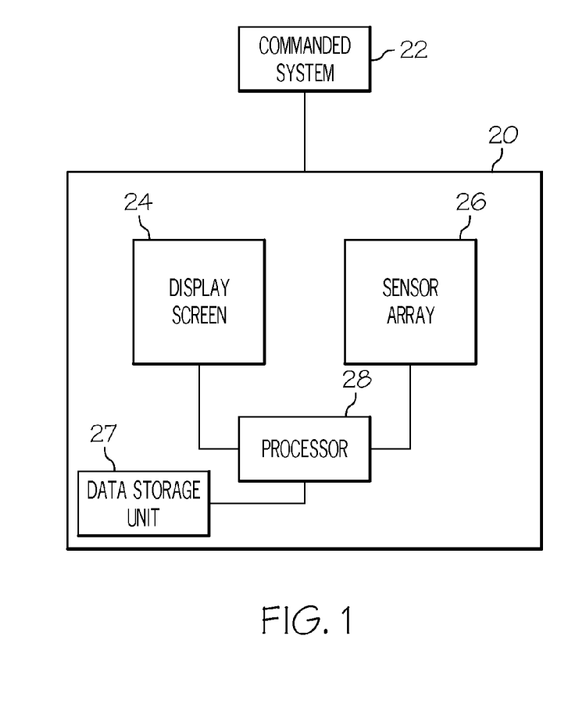
FIG. 1 is a schematic illustration of an embodiment of a touch screen system for use with a commanded system requiring high integrity.

FIG. 1 is a schematic illustration of an embodiment of a touch screen system 20 for use with a commanded system 22 requiring high integrity. Touch screen system 20 includes a display screen 24, a sensor array 26, a data storage unit 27, and a processor 28. Touch screen system 20 is operatively coupled to commanded system 22. As used herein, the term "operatively coupled" means that one component has the ability to, and is configured to, control another component via a communicative connection between the two components. In some embodiments, touch screen system 20 may include additional elements. For example, touch screen system 20 may include a communication unit which may be used to provide commands to, and to receive feedback from, commanded system 22.

Touch screen system 20 may be used in a wide variety of applications where high integrity is required including, but not limited to, vehicular applications, industrial applications and medical applications. For example, touch screen system 20 may be used on an aircraft to control the deployment and the storage of the aircraft's landing gear. In another example, touch screen system 20 may be used in a manufacturing facility to actuate stamping machines or to control the mixing of harmful chemicals. In still another example, touch screen system 20 may be used in an operating room to control the administration of medications. In each instance, touch screen system 20 receives an input in the form of a touch and provides an output in the form of a command to commanded system 22 (i.e., the landing gear, the stamping machine, and the intravenous pump).

Display screen 24 may be any sort or type of display system that is configured to depict graphic images and/or text. Examples of suitable display systems include, but are not limited to, a Cathode Ray Tube (CRT) display device, a flat panel display device, a Liquid Crystal Display (LCD) device, a thin film transistor (TFT) display device, a plasma display device, an electro-luminescent display device, a Light Emitting Diode (LED) display device, a holographic display device such as a Heads Up Display (HUD), a Micro Mirror Device (MMD) display device, electromechanical device or the like. In some embodiments, display screen 24 may comprise only a single component. In other embodiments, display screen 24 may comprise a plurality of components acting in concert. In some embodiments, display screen 24 may be dedicated for use exclusively with touch screen system 20 while in other embodiments, display screen 24 may be shared with other systems on board the aircraft.

Sensor array 26 is associated with display screen 24. In some embodiments, sensor array 26 may include multiple sensor elements cooperatively connected and configured to detect a touch by an operator. In other embodiments, sensor array 26 may include only a single sensor element configured to detect touch by the operator. Sensor array 26 may also include any electronics needed to detect an operator's touch and also to detect the location of such a touch. Sensor array 26 may employ any known or subsequently developed technology for detecting the operator's touch on display screen 24. Known technologies include, but are not limited to, resistive, surface capacitive, projected capacitive, infrared, surface acoustic wave, acoustic pulse recognition, and camera based.

Sensor array 26 may be arranged with respect to display screen 24 in any manner necessary to effectuate the ability of sensor array 26 to detect an operator's touch. As used herein, the term "touch" shall refer to either physical contact or near physical contact with display screen 24 that is made using a body part, a stylus, a projector or any other type of pointer or contact device designed and/or configured to trigger a detection by sensor array 26. In some non-limiting embodiments, sensor array 26 may be a separate component that is collocated with, or dispose proximate to, display screen 24. In other non-limiting embodiments, sensor array 26 may be integrated into display screen 24 and may be inseparable therefrom.

Sensor array 26 may further be configured to calculate a set of touch position coordinates in response to detecting the touch by the operator on display screen 24. As used herein, the term "set of touch position coordinates" refers to location information or location data that corresponds to the location of a touch on the surface of display screen 24 (e.g., such as the X and Y location on an imaginary X and Y axis overlaid over display screen 24) as observed/detected by sensor array 26. Sensor array 26 may be further configured to generate a signal containing the set of touch position coordinates in response to detecting the touch of the operator on display screen 24.

Data storage unit 27 may be any type of electronic memory device that is configured to store data. For example, data storage unit 27 may include, without limitation, non-volatile memory, disk drives, tape drives, and mass storage devices and may include any suitable software, algorithms and/or sub-routines that provide the data storage component with the capability to store, organize, and permit retrieval of data. In some embodiments, data storage unit 27 may comprise only a single component. In other embodiments, data storage unit 27 may comprise a plurality of components acting in concert. In some embodiments, data storage unit 27 may be dedicated for use exclusively with touch screen system 20 while in other embodiments, data storage unit 27 may be shared with other systems.

Processor 28 may be any type of computer, computer system, microprocessor, collection of logic devices such as field-programmable gate arrays (FPGA), or any other analog or digital circuitry that is configured to calculate, and/or to perform algorithms, and/or to execute software applications, and/or to execute sub-routines, and/or to be loaded with and to execute any type of computer program or algorithm.

Processor 28 may comprise a single processor or a plurality of processors acting in concert. In some embodiments, processor 28 may be dedicated for use exclusively with touch screen system 20 while in other embodiments processor 28 may be shared with other systems. In still other embodiments, processor 28 may be integrated with any of the other components of touch screen system 20, such as, but not limed to, display screen 24 and sensor array 26.

In the embodiment illustrated in FIG. 1, processor 28 is operatively coupled to display screen 24 and to data storage unit 27 and communicatively connected to sensor array 26. Such connections may be effected through the use of any suitable means of transmission including both wired and wireless connections. For example, each component may be physically connected to processor 28 via a coaxial cable or via any other type of wire connection effective to convey electronic signals. In the illustrated embodiment, processor 28 is directly connected to each of the other components. In other embodiments, each component may be communicatively connected to processor 28 across a bus or other similar communication corridor. In still other examples, each component may be connected wirelessly to processor 28 via any wireless connection effective to communicate signals between components. Examples of suitable wireless connections include, but are not limited to, a Bluetooth connection, a WiFi connection, an infrared connection or the like.

Being communicatively connected (or operatively coupled) provides a pathway for the transmission of commands, instructions, interrogations, and other signals between processor 28 and each of the other components. Through this communicative connection, processor 28 may control and/or communicate with each of the other components. Each of the other components discussed above are configured to interface and engage with processor 28. For example, in an embodiment, display screen 24 is configured to receive commands from processor 28 and to display images on display screen 24 in response to such commands. In an embodiment, data storage unit 27 is configured to store a list of unique X and Y coordinates for each high integrity touch target image and may be further configured to provide that list to processor 28 when requested. Also, in an embodiment, sensor array 26 is configured to detect touches on display screen 24, to convert such touches to a set of detected touch coordinates, and to provide the set of detected touch coordinates to processor 28.

Processor 28 is configured to interact with, coordinate with, and/or orchestrate the activities of each of the other components of touch screen system 20 for the purpose of displaying touch target images and high integrity touch target images on display screen 24, for the purpose of determining when such touch target images and high integrity touch target images have been selected by an operator, and for the purpose of providing commands to commanded system 22. In an embodiment, processor 28 is further programmed and/or otherwise configured to provide commands to display screen 24 to display each high integrity touch target image such that each image is positioned on display screen 24 at a location that has a unique X coordinate and a unique Y coordinate. Because no other touch target image shares either an X coordinate or a Y coordinate with the high integrity touch target image, accidental selection of the high integrity touch target image by an operator has a lower likelihood than that associated with traditional arrangements.

Processor 28 may be further configured to receive the set of detected touch coordinates from sensor array 26, to obtain the list of unique X and Y coordinates from data storage unit 27, and to invalidate any touch detected by sensor array 26 when the set of detected touch coordinates corresponding to that touch includes a unique X coordinate of a high integrity touch target image but which does not also include the corresponding unique Y coordinate for that high integrity touch target image. Processor 28 may be further configured to invalidate any touch detected by sensor array 26 when the set of detected touch coordinates corresponding to that touch includes a unique Y coordinate of a high integrity touch target image, but which does not also include the corresponding unique X coordinate for that high integrity touch target image.

Figure 2:
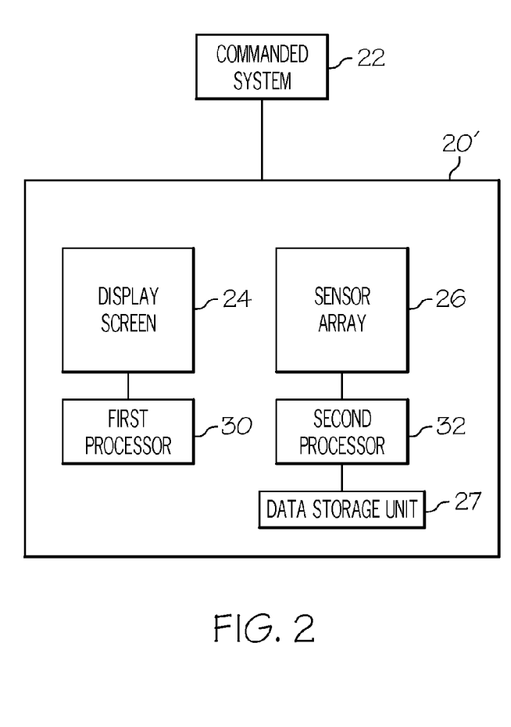
FIG. 2 is a schematic illustration of another embodiment of a touch screen system for use with a commanded system requiring high integrity.

FIG. 2 is a schematic illustration of another embodiment of a touch screen system 20' for use with commanded system 22 requiring high integrity. Touch screen system 20' includes display screen 24, sensor array 26 and data storage unit 27. Touch screen system 20' also includes a first processor 30 operatively coupled to display screen 24 and a second processor 32 communicatively connected to sensor array 26.

In touch screen system 20', first processor 30 is configured to interact with, coordinate with, and/or orchestrate the activities of display screen 24 for the purpose of displaying touch target images and high integrity touch target images on display screen 24. In an embodiment, first processor 30 is further programmed and/or otherwise configured to provide commands to display screen 24 to display each high integrity touch target image such that each image is positioned on display screen 24 at a location that has a unique X coordinate and a unique Y coordinate. Because no other touch target image shares either an X coordinate or a Y coordinate with the high integrity touch target image, accidental selection of the high integrity touch target image by an operator has a lower likelihood than that associated with traditional arrangements.

Second processor 32 is configured to interact with sensor array 26 and with data storage unit 27 for the purpose of determining when such touch target images and high integrity touch target images have been selected by an operator and also for the purpose of providing commands to commanded system 22. Second processor 32 is configured to receive the set of touch coordinates from sensor array 26 and to obtain the list of unique X and Y coordinates from data storage unit 27, and to invalidate any touch detected by sensor array 26 when the set of detected touch coordinates corresponding to that touch includes an X coordinate of a high integrity touch target image that does not also included the corresponding Y coordinate for that high integrity touch target image. Processor 28 may be further configured to invalidate any touch detected by sensor array 26 when the set of detected touch coordinates corresponding to that touch includes a Y coordinate of a high integrity touch target image that does not also include the corresponding X coordinate for that high integrity touch target image.

Figure 3:
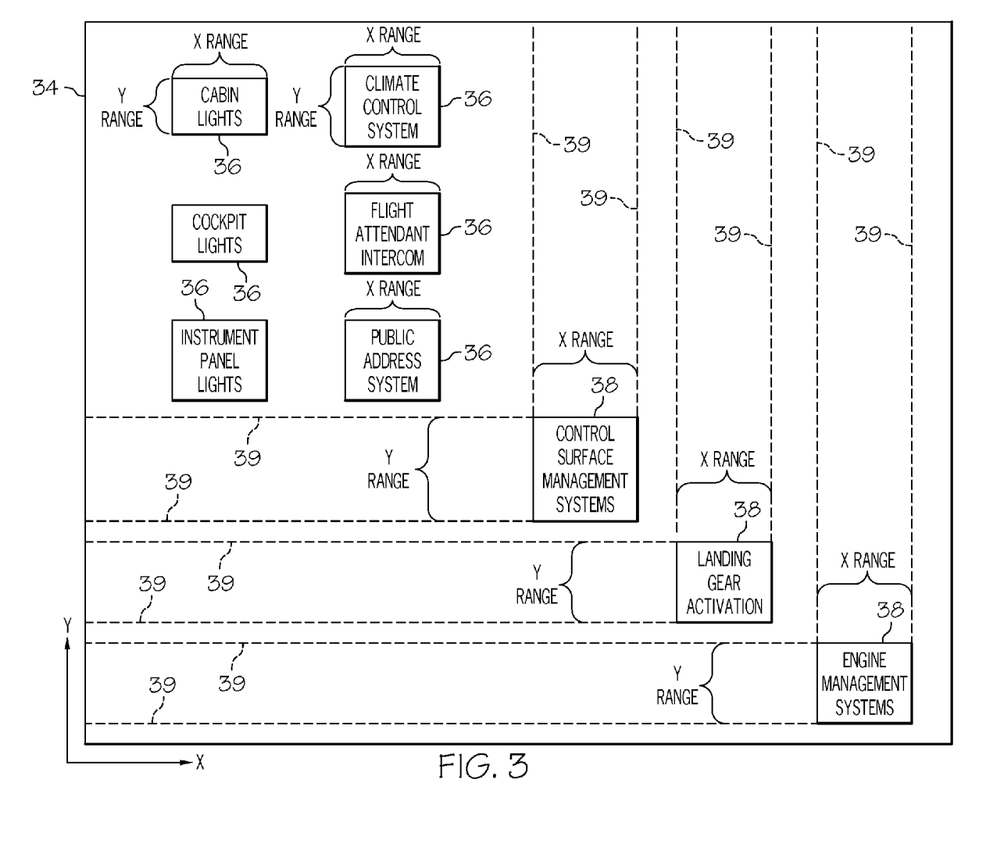
FIG. 3 is an illustration of an example of a touch screen display generated by the touch screen systems of FIGS. 1 and 2.

FIG. 3 is an illustration of an example of a touch screen display generated by the touch screen systems 20, 20' of FIGS. 1 and 2. An XY axis has also been included at the lower left portion of FIG. 3 to provide an orientation for the discussion that follows. With continuing reference to FIGS. 1 and 2, touch screen display 34 includes multiple touch target images 36. Each touch target image 36 spans a range of X-coordinates and a range of Y-coordinates to allow some latitude in the location of touch by an operator attempting to select a particular touch target image 36. The range may vary depending upon a variety of factors including, but not limited to, the shape of the touch target image and the number of touch target images displayed. Touch target images 36 are associated with commands to commanded system 22 that do not require high integrity, such as operating cabin lights and actuating a public address system. Because these commands do not require high integrity, processor 28 and/or first processor 30 has commanded display screen 24 to display touch target images 36 in a traditional manner wherein one or more touch target image 36 has an X-coordinate or a Y-coordinate in common with another touch target image 36. For example, the range of X-coordinates for the touch target image that actuates the climate control system is the same as the range of X-coordinates for the touch target image that actuates the flight attendant intercom as well as the range of X-coordinates for the touch target image that actuates the public address system. The range of Y-coordinates for the touch target image that actuates the climate control system is the same as the range of Y-coordinates for the touch target image that actuates the cabin lights.

Touch screen display 34 also includes a plurality of high integrity touch target images 38. As with each touch target image 36, each high integrity touch target image 38 also spans a range of X-coordinates and a range of Y-coordinates to allow some latitude in the location of touch by an operator attempting to select a particular high integrity touch target image 38. The range may vary depending upon a variety of circumstances including, but not limited to, the shape of the touch target image, the number of touch target images displayed, and the level of integrity required by commanded system 22. High integrity touch target images 38 are associated with commands to commanded system 22 that require high integrity, such as activating an aircraft's landing gear. Accordingly, processor 28 and/or first processor 30 have arranged each of the high integrity touch target images 38 in a manner such that their respective X-coordinate ranges and their respective Y-coordinate ranges do not overlap with the X-coordinate range or the Y-coordinate range of any other high integrity touch target image 38 or any of the touch target images 36. This is illustrated through the use of phantom lines 39 in FIG. 3 to illustrate a corridor for the X range and the Y range for each of the illustrated high integrity touch target images 38 to illustrate that no other touch target image falls with those corridors. Accordingly, if sensor array 26 detects a touch having a set of detected touch coordinates that includes X coordinates that fall within the X range corridor for a particular high integrity touch target image 38, but which lacks Y coordinates that fall within a corresponding Y range corridor, processor 28 and/or second processor 32 are configured to invalidate that touch. As used herein, the term "invalidate", when used in conjunction with the term "touch" means to refrain from transmitting any command to commanded system 22 and/or to issue a warning detectable by the operator.

Figure 4:
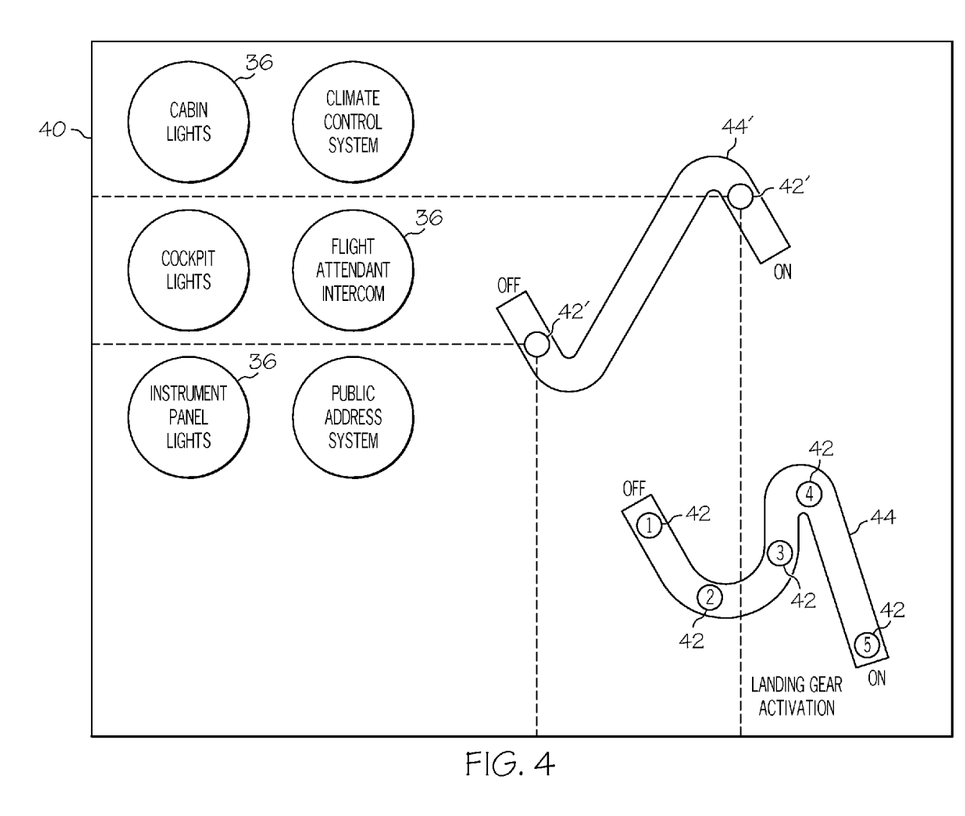
FIG. 4 is an illustration of another example of a touch screen display generated by the touch screen systems of FIGS. 1 and 2.

FIG. 4 is an illustration of another example of a touch screen display 40 generated by the touch screen systems 20, 20' of FIGS. 1 and 2. With continuing reference to FIGS. 1 and 2, processor 28 and first processor 30 may be further configured to give commands to display screen 24 to display a plurality of high integrity touch target images 42, each of which has a unique set of X-coordinate ranges and a unique set of Y-coordinate ranges. In this example, multiple high integrity touch target images 42 must be selected by an operator in order to issue the associated command to commanded system 22. This is illustrated in FIG. 4 where five individual high integrity touch target images 42 are displayed. In an embodiment, all high integrity touch target images 42 must be touched by an operator in order to send a command to commanded system 22 to actuate the landing gear. In other examples, a greater or lesser number of high integrity touch target images 42 may be displayed.

In an embodiment, each of the high integrity touch target images 42 must be touched in a particular sequence. For example, the illustrated high integrity touch target images 42 in FIG. 4 each contain a number displayed at its center. The numbers are one through five and they indicate the sequence in which the high integrity touch target images must be selected. In FIG. 4, the numbers are arranged sequentially. In other embodiments, the sequence may vary to provide and even greater level of certainty that the associated command has been intentionally selected by the operator.

In another embodiment, processor 28 and/or first processor 30 may provide instructions to display screen 24 to display a visibly bounded pathway 44 that encompasses each high integrity touch target image 42 for a particular command to assist an operator in determining the proper sequence for touching each high integrity touch target image 42. Visibly bounded pathway 44 may also assist the operator in determining which high integrity touch target image 42 is associated with which command. In such examples, an operator need only trace their finger, a stylus, or another implement along the pathway to ensure that each individual high integrity touch target image 42 is touched. An "on" and "off" notation may be displayed adjacent opposite ends of visibly bounded pathway 44 to assist the operator in determining where to begin and end a touch on a pathway, depending upon whether the operator is attempting to activate or deactivate commanded system 22.

In addition, as illustrated in FIG. 4, more than one pathway can coexist on touch screen display 40 and provide flexibility in screen layout as long as their touch targets do not share common X or Y coordinates. As illustrated in FIG. 4, there are two pathways including visibly bounded pathway 44 and a second visibly bounded pathway 44'. Visibly bounded pathway 44 includes multiple high integrity touch target images 42 and second visibly bounded pathway 44' contains multiple high integrity touch target images 42'. As illustrated, the high integrity touch targets 42 and the high integrity touch target images 42' do not have overlapping coordinates in either the X or the Y axes despite the fact that the pathways themselves visibly appear to overlap.

In such embodiments, processor 28 and/or second processor 32 may be configured to validate a touch (i.e., to transmit the command to commanded system 22) when fewer than all of the high integrity touch target images encompassed by visibly bounded pathway 44 are touched. For example, an operator may need to touch only 80% of the high integrity touch target images encompassed within visibly bounded pathway 44 in order for the touch to be validated. This allows an operator to avoid repeating a touch motion when there is an unintended and/or a brief discontinuity of physical contact with display screen 24. In another embodiment, processor 28 and/or second processor 32 may be configured to invalidate a touch along visibly bounded pathway 44 if the operator takes longer than a predetermined period of time to touch each of the high integrity touch target images 42 encompassed by visibly bounded pathway 44. For example, if the operator fails to touch all high integrity touch target images 42 encompassed by visibly bounded pathway 44 within one half of a second or as established by human factors engineering for the system, the touch may be invalidated.

Figure 5:
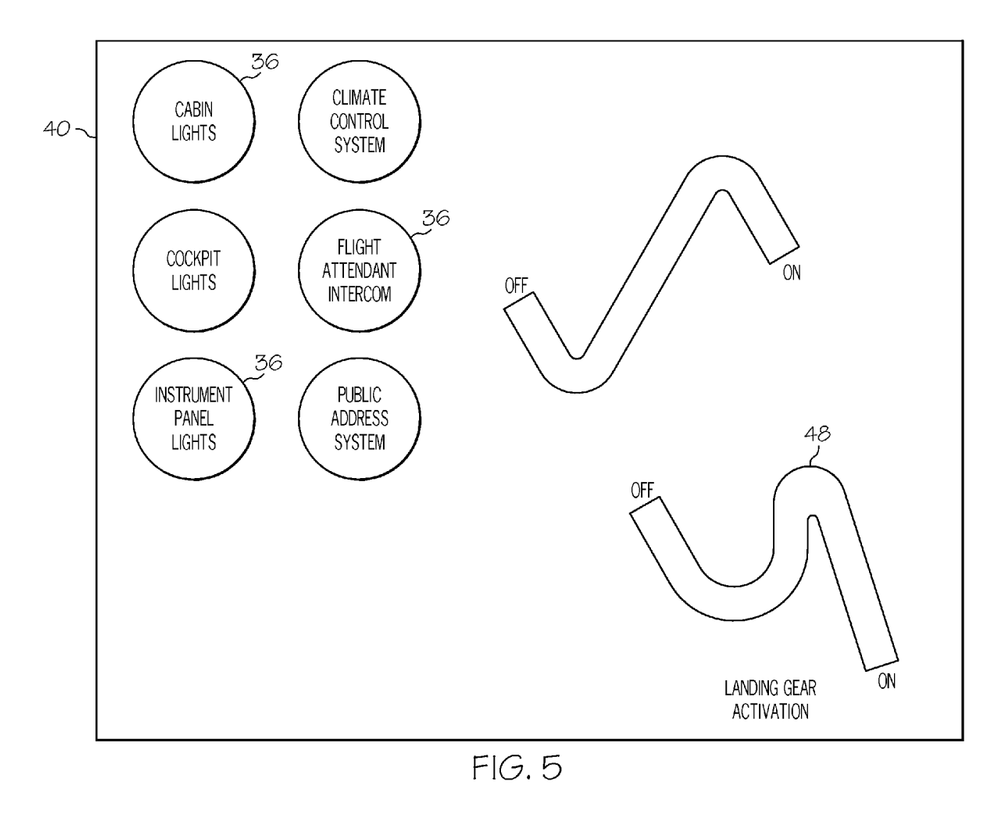
FIG. 5 is an illustration of another example of a touch screen display generated by the touch screen systems of FIGS. 1 and 2.

FIG. 5 is an illustration of another example of a touch screen display 46 generated by the touch screen systems 20, 20' of FIGS. 1 and 2. With continuing reference to FIGS. 1 and 2, processor 28 and/or first processor 30 may be further configured to command display screen 24 to display an opaque pathway 48 over the high integrity touch target images. In this embodiment, the operator would have to slide a finger, a stylus, or another implement along the entire pathway in order to select the desired command.

Figure 6:
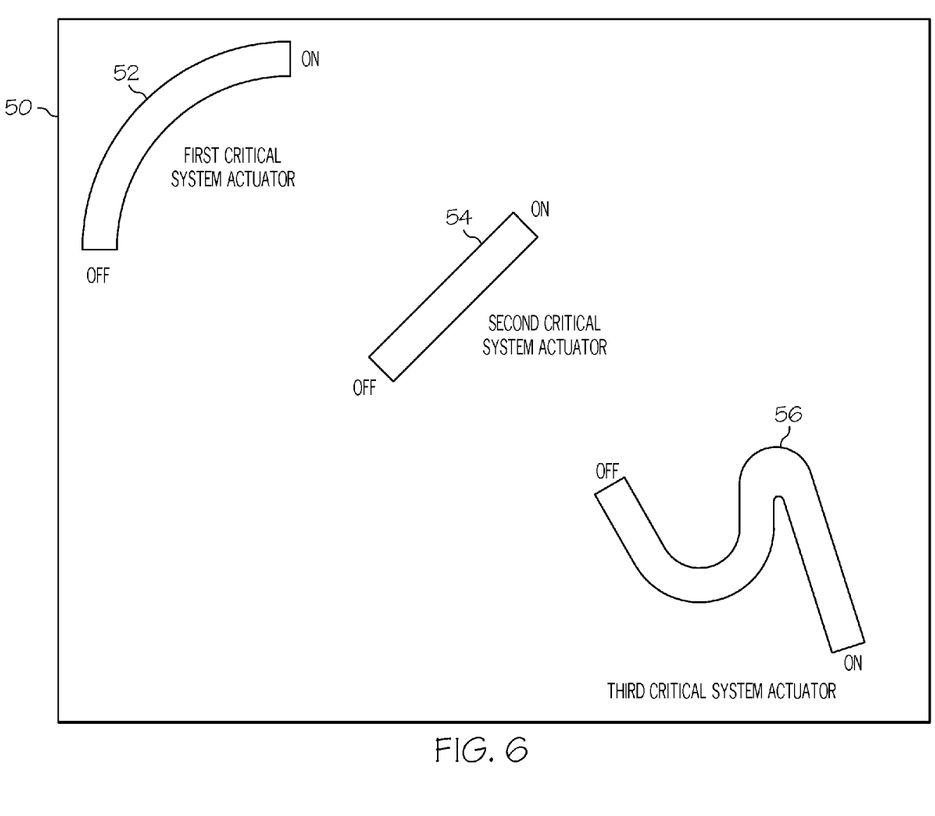
FIG. 6. is an illustration of yet another example of a touch screen display generated by the touch screen systems of FIGS. 1 and 2.

FIG. 6. is an illustration of yet another example of a touch screen display 50 generated by the touch screen systems 20, 20' of FIGS. 1 and 2. With continuing reference to FIGS. 1 and 2, touch screen display 50 illustrates various pathway shapes which may be desirable for pathways generated by processor 28 and/or first processor 30. Pathway 52 is in the shape of an arc, pathway 54 is in the shape of a straight line and pathway 56 is in the shape of an oscillating curve. Other shapes are also possible. Each of these shapes may encompass any number of high integrity touch target images (whether visible or obscured) which have unique X and Y coordinates.

Figure 7:
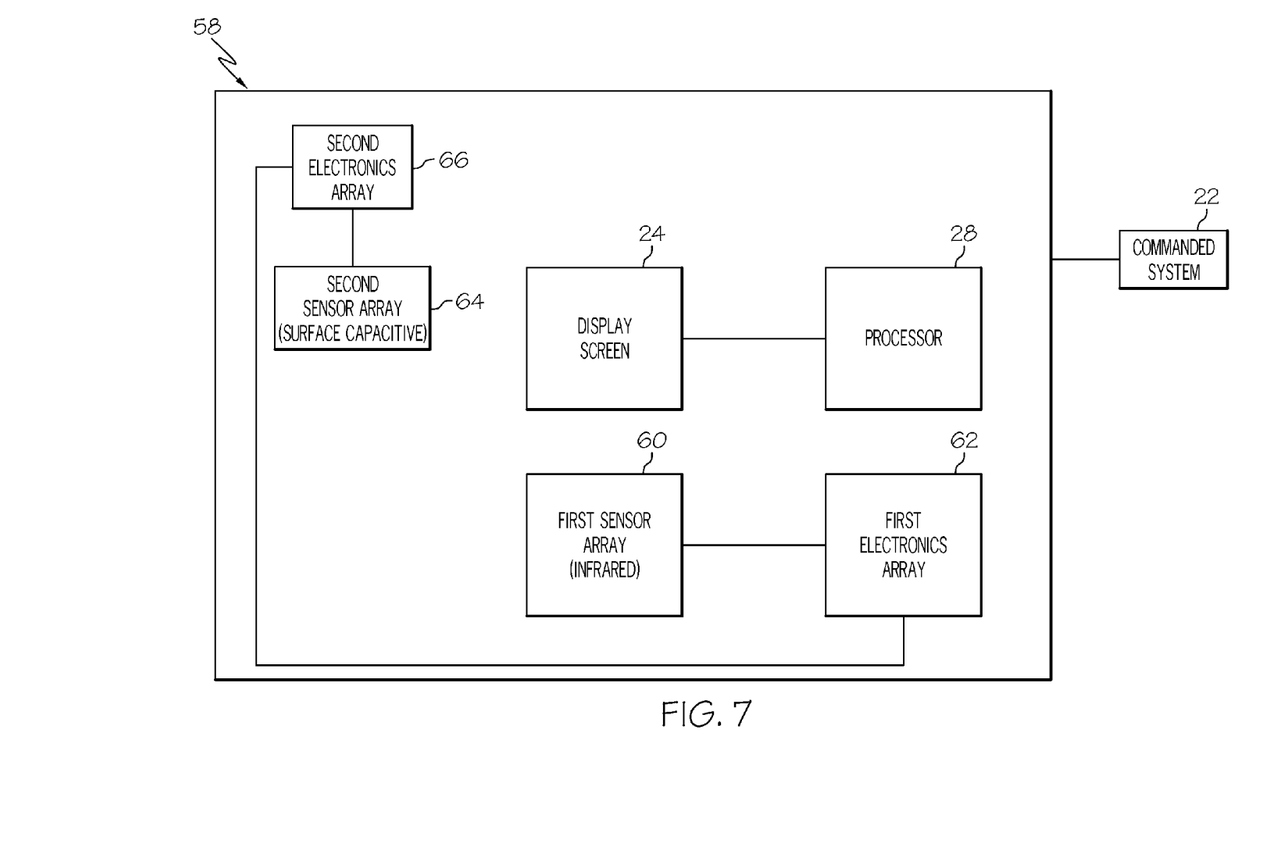
FIG. 7. is a schematic illustration of yet another embodiment of a touch screen system for use with a commanded system requiring high integrity.

FIG. 7. is a schematic illustration of yet another embodiment of a touch screen system 58 for use with commanded system 22 requiring high integrity. Touch screen system 58 includes display screen 24, processor 28, a first sensor array 60, first electronics array 62, second sensor array 64 and second electronics array 66. Processor 28 is operatively coupled to display screen 24 and is configured to provide display screen 24 with commands to display a plurality of touch target images on display screen 24 and to display one or more high integrity touch target images on display screen 24 such that each touch target image has a unique X-coordinate or a unique range of X-coordinates and a unique Y-coordinate or a unique range of Y-coordinates.

In an embodiment, first sensor array 60 is disposed sufficiently close to display screen 24 to detect touches to display screen 24. In some embodiments, first sensor array 60 may have direct physical contact with display screen 24. First sensor array 60 is configured to detect exclusively the X-coordinate of a touch by an operator on display screen 24.

In an embodiment, first sensor array 60 is communicatively connected to first electronics array 62. First electronics array 62 is configured to store the unique X-coordinate and the unique Y-coordinate for each high integrity touch target image displayed on display screen 24. In an embodiment, first electronics array 62 may comprise a data storage unit and a processor. In other embodiments, first electronics array 62 may comprise any other electronics equipment capable of storing data and executing computer code. In some embodiments, first electronics array 62 may used exclusively for services related to first sensor array 60. In other embodiments, first electronics array 62 may be shared with other components of touch screen system 58, or with components of other systems.

In an embodiment, first sensor array 60 is configured to provide the X-coordinate of any touch detected on display screen 24 to first electronics array 62 and first electronics array 62 is configured to store that X-coordinate.

In an embodiment, second sensor array 64 is disposed sufficiently close to display screen 24 to detect touches to display screen 24. In some embodiments, second sensor array 64 may have direct physical contact with display screen 24 or with first sensor array 60, or with both. Second sensor array 64 is configured to detect exclusively the Y-coordinate of a touch by an operator on display screen 24.

In an embodiment, second sensor array 64 is communicatively connected to second electronics array 66. Second electronics array 66 is configured to store the unique X-coordinate and the unique Y-coordinate for each high integrity touch target image displayed on display screen 24. In an embodiment, second electronics array 66 may comprise a data storage unit and a processor. In other embodiments, second electronics array 66 may comprise any other electronics equipment capable of storing data and executing computer code. In some embodiments, second electronics array 66 may used exclusively for services related to second sensor array 64. In other embodiments, second electronics array 66 may be shared with other components of touch screen system 58, or with components of other systems.

In an embodiment, second sensor array 64 is configured to provide the Y-coordinate of any touch detected on display screen 24 to second electronics array 66 and second electronics array 66 is configured to store that Y-coordinate.

In an embodiment, first electronics array 62 and second electronics array 66 are communicatively connected. First electronics array 62 is configured to provide the X-coordinate received from first sensor array 60 to second electronics array 66. Similarly, second electronics array 66 is configured to provide the Y-coordinate received from second sensor array 64 to first electronics array 62.

In an embodiment, first electronics array 62 and second electronics array 66 are each configured to combine the Y-coordinate or the X-coordinate received from the other electronics array with the X-coordinate or the Y-coordinate that it has received from its respective sensor array and to then compare the combined XY coordinates with the listing of unique X and unique Y coordinates associated with the high integrity touch target images to confirm that the XY coordinates coincide with corresponding unique X and unique Y coordinates. In an embodiment, first electronics array 62 and second electronics array 66 are each further configured to determine whether the detected touch is a valid touch or an invalid touch based on this comparison.

In an embodiment, first sensor array 60 and second sensor array 64 each utilize different touch screen technologies to detect a touch by the operator. For example, first sensor array 60 may utilize an infra red technology to detect a touch by an operator while second sensor array 64 may utilize a surface capacitive technology to detect a touch by an operator.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A touch screen system deployed onboard an aircraft including a first commanded aircraft system requiring high integrity input commands and a second commanded aircraft system not requiring high integrity input commands, the touch screen system comprising:
    a display screen configured to present information to an operator;
    a sensor array arranged proximate the display screen, the sensor array configured to detect a touch by the operator on the display screen and to generate a set of touch position coordinates corresponding to a location of the touch on the display screen; and
    a processor operatively coupled to the display screen and configured to generate thereon at least one high integrity touch target image and a plurality of non-high integrity touch target images, the at least one high integrity touch target image utilized in the control of at least one function of the first commanded aircraft system and the plurality of non-high integrity touch target images utilized in the control of at least one function of the second commanded aircraft system;
    wherein the processor is further configured to command the display screen to display the touch target images such that each high integrity touch target image has a unique X-coordinate that is not shared by any other touch target image and a unique Y-coordinate that is not shared by any other touch target image, while at least two of the plurality of non-high priority touch target images share at least one of an X-coordinate and a Y-coordinate, as displayed on the display screen.

2. The touch screen system of claim 1, further comprising a data storage unit configured to store the unique X-coordinate and the unique Y-coordinate for the high integrity touch target image, wherein the processor is operatively coupled to the data storage unit and communicatively connected to the sensor array and wherein the processor is configured to receive the set of touch position coordinates from the sensor array, to obtain the unique X-coordinate and the unique Y-coordinate for the high integrity touch target image from the data storage unit, and to invalidate the touch when the set of touch position coordinates includes the unique X-coordinate but lacks the unique Y-coordinate, and vice versa.

3. The touch screen system of claim 1, further comprising a second processor communicatively connected to the sensor array and configured to receive the set of touch position coordinates from the sensor array and wherein the second processor is further configured to invalidate the touch when the set of touch position coordinates includes the unique X-coordinate but lacks the unique Y-coordinate, and vice versa.

4. The touch screen system of claim 1, wherein the high integrity touch target image covers a defined area on the display screen, wherein the defined area falls within a range of X-coordinates and a range of Y-coordinates, wherein each X coordinate within the range of X-coordinates differs from each X-coordinate of every other touch target image, and wherein each Y coordinate within the range of Y-coordinates differs from each Y-coordinate of every other touch target image.

5. A touch screen system deployed onboard an aircraft including a first commanded aircraft system requiring high integrity input commands, the touch screen system comprising:
    a display screen configured to present information to an operator;
    a sensor array arranged proximate the display screen, the sensor array configured to detect a touch by the operator on the display screen and to generate a set of touch position coordinates corresponding to a location of the touch on the display screen;
    a data storage unit; and
    a processor operatively coupled to the display screen and to the data storage unit and communicatively connected to the sensor array, the processor configured to provide commands to the display screen to display a plurality of touch target images including a first plurality of high integrity touch target images utilized in the control of at least one function of the first commanded aircraft system,
    wherein the processor is further configured to command the display screen to:
        (i) arrange the plurality of touch target images such that each high integrity touch target has a unique X-coordinate that is not shared by any other touch target image and a unique Y-coordinate that is not shared by any other touch target image, as displayed on the display screen; and
        (ii) display a first touch pathway encompassing the first plurality of high integrity touch target images and visually indicating a predetermined sequence in which the first plurality of high integrity touch target images need be touched to control the function of the first commanded aircraft system;
    wherein the data storage unit is configured to store a list of the unique X-coordinate and the unique Y-coordinate for each of the high integrity touch target images, wherein the processor is further configured to receive the set of touch position coordinates from the sensor array and to obtain the list from the data storage unit, and wherein the processor is further configured to accept a touch input command utilized in the control of the first commanded aircraft system as valid only when the first plurality of high integrity touch target images is touched in the predetermined sequence.

6. The touch screen system of claim 5, wherein the processor is further configured to command the display screen to display a second touch pathway encompassing a second plurality of high integrity touch target images, the second touch pathway overlapping with the first touch pathway, as taken along at least one of the X-axis and the Y-axis, while each of the high integrity touch target images encompassed by the first and second touch pathways has a unique X-coordinate and a unique Y-coordinate not shared by any other high integrity touch target image displayed on the display screen.

7. The touch screen system of claim 5, wherein the first touch pathway obscures the plurality of touch target images.

8. The touch screen system of claim 5, wherein the first touch pathway forms a substantially straight line.

9. The touch screen system of claim 5, wherein the first touch pathway forms an arc.

10. The touch screen system of claim 5, wherein the first touch pathway forms an oscillating curve.

11. The touch screen system of claim 5, wherein the processor is further configured to invalidate the touch unless the first plurality of high integrity touch target images are touched within a predetermined period of time.

12. The touch screen system of claim 11, wherein the predetermined period of time is one half of a second.

13. A touch screen system deployed onboard an aircraft, the touch screen system comprising:
   a first commanded aircraft system requiring high integrity input commands;
   a display screen mounted in the aircraft;
   at least one sensor array disposed proximate the display screen and configured to detect the coordinates of touch inputs on the display screen; and
   a processor coupled to the first commanded aircraft system, to the display screen, and to the at least one sensor array, the processor configured to:
      (i) generate a plurality of high integrity touch target images on the display screen arranged such that each high integrity touch target image has a unique X-coordinate not shared by any other high integrity touch target image and a unique Y-coordinate not shared by any other high integrity touch target image displayed on the display screen;
      (ii) accept, as a valid user input, selection of a high integrity touch target image only when the coordinates of a given touch input detected by the sensor array corresponds to both the unique X-coordinate and the unique Y-coordinate of the high integrity touch target image; and
      (iii) control at least one function of the first commanded aircraft system in response to valid user input selecting at least one of the plurality of high integrity touch target images.

14. The touch screen system of claim 13, further comprising a second commanded aircraft system not requiring high integrity input commands, the processor coupled to the second commanded aircraft system and further configured to:
   (i) generate a plurality of non-high integrity touch target images on the display screen; and
   (ii) control at least one function of the second commanded aircraft system in response to user selection of at least one of the plurality of non-high integrity touch target images.

15. The touch screen system of claim 14, wherein the processor is configured to arrange the plurality of high integrity images and the plurality of non-high integrity images on the display screen such that each high integrity touch target image has a unique X-coordinate not shared by any other touch target image and a unique Y-coordinate not shared by any other touch target image, while at least two of the plurality of non-high priority touch target images share at least one of an X-coordinate and a Y-coordinate.

16. The touch screen system of claim 13, wherein the first commanded aircraft system is a landing gear system, and wherein at least one of the plurality of high integrity touch target images is utilized to control the deployment and stowage of the aircraft landing gear.

17. The touch screen system of claim 13, wherein at least one of the plurality of high integrity touch target images is utilized to adjust at least one function of the first commanded aircraft system controlling the flight performance of the aircraft.

18. The touch screen system of claim 13, wherein the at least one sensor array comprises:
   a first sensor array coupled to the processor and configured to detect the X-coordinates of touch input commands on the display screen, while not detecting the Y-coordinates of the touch input commands; and
   a second sensor array coupled to the processor and configured to detect the Y-coordinates of touch input commands on the display screen, while not detecting the X-coordinates of the touch input commands;
   wherein the first and second sensor arrays utilize different touch screen technologies to detect touch inputs commands on the display screen, and wherein the processor is configured to combine the X-coordinates received from the first sensor array with the Y-coordinates received from the second sensor array to determine the XY coordinates of touch input commands on the display screen.

* * * * *